UNITED STATES PATENT OFFICE.

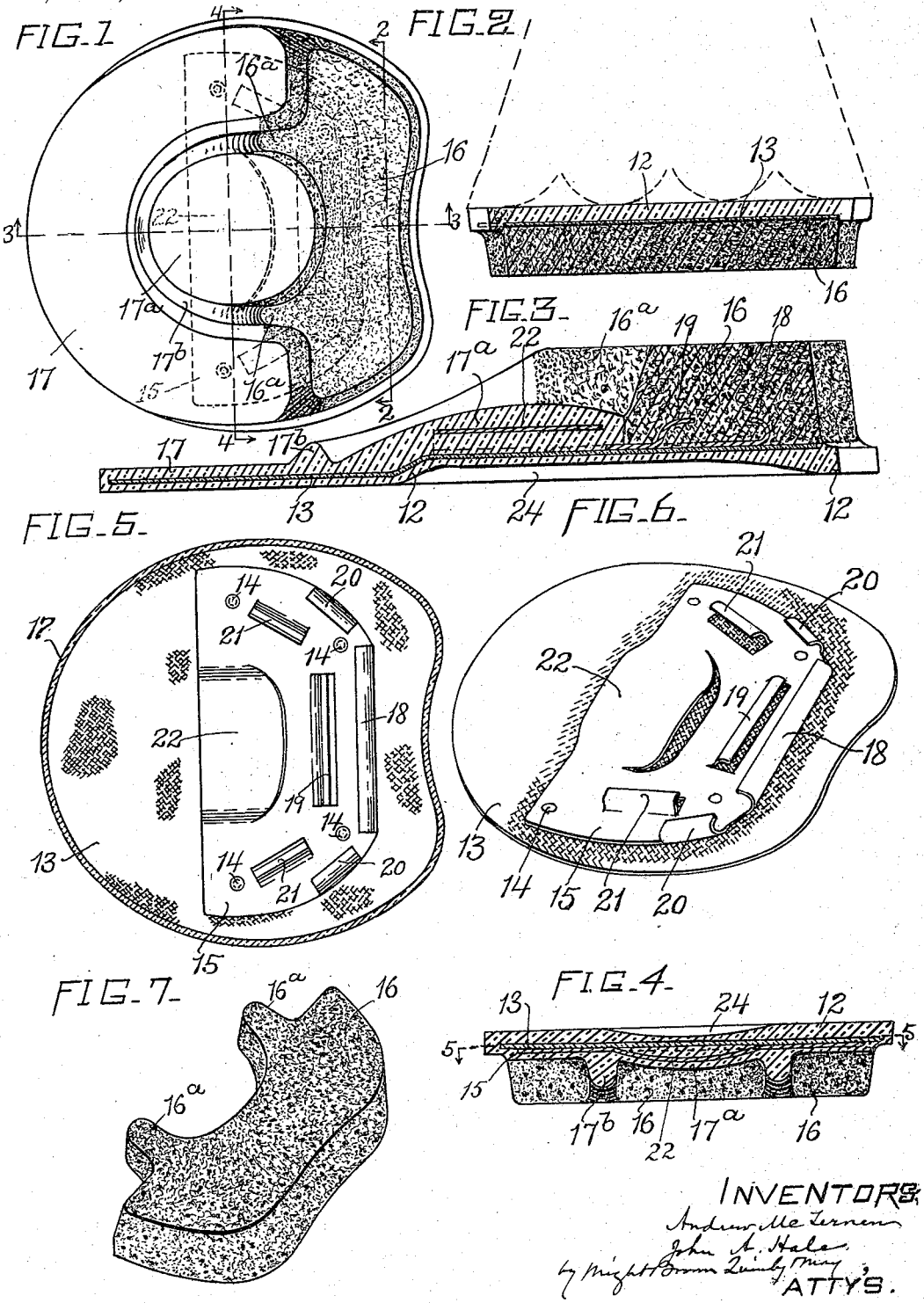

ANDREW McTERNEN, OF ANDOVER, AND JOHN A. HALE, OF BOSTON, MASSACHUSETTS, ASSIGNORS TO McTERNEN RUBBER MANUFACTURING COMPANY, OF READING, MASSACHUSETTS, A CORPORATION OF MAINE.

HORSESHOE-PAD.

1,174,430.　　　Specification of Letters Patent.　　Patented Mar. 7, 1916.

Application filed January 22, 1916. Serial No. 73,610.

*To all whom it may concern:*

Be it known that we, ANDREW MCTERNEN and JOHN A. HALE, both citizens of the United States, and residents, respectively, of Andover, in the county of Essex, and of Boston, in the county of Suffolk and State of Massachusetts, have invented new and useful Improvements in Horseshoe-Pads, of which the following is a specification.

This invention relates to a horse shoe pad composed of a relatively thin body formed to be interposed between a horse shoe and the corresponding portion of the bottom of a hoof, and to cover the said bottom, and a relatively thick elastic heel block vulcanized to the body and having a tread surface located under the heel portion of the pad.

The invention has for its object, first, to provide a simple, durable and relatively inexpensive hoof pad the body portion of which is relatively stiff and the heel block suitably elastic, and secondly, to provide a resilient heel block less liable to slip than heretofore.

The invention is embodied in the improvements hereinafter described.

Of the accompanying drawings forming a part of this specification: Figure 1 represents a bottom plan view of a horse shoe pad embodying our invention; Fig. 2 represents a section on line 2—2 of Fig. 1; Fig. 3 represents a section on line 3—3 of Fig. 1; Fig. 4 represents a section on line 4—4 of Fig. 1; Fig. 5 represents a section on line 5—5 of Fig. 4; Fig. 6 represents a perspective view of the reinforcing layer and reinforcing plate hereinafter referred to; Fig. 7 represents a perspective view of the heel cushion as it appears before vulcanization.

The same reference characters indicate the same or similar parts in all the views.

12 represents a layer composed of a vulcanizable composition constituting the back of the pad, and of such nature that it is rendered relatively hard and stiff by vulcanization, so that it resists wear and abrasion by contact with the bottom of the hoof. Said composition may be a mixture of the following ingredients in substantially the following proportions by weight: ground rags, twenty-five parts, ground cured scrap rubber, twenty-five parts, reclaimed rubber, fourteen parts, litharge, one and one-half parts, lime, one part, red oxid of iron, ten parts, mineral rubber or asphalt, seven parts, sulfur, one and one-half parts.

On the layer 12 is laid a layer 13 of textile fabric, such as cotton duck or canvas, preferably frictioned, the marginal portion of the layer 12 covering the margin of the fabric layer 13. To the fabric layer is attached by rivets 14 a reinforcing plate 15 of sheet metal, such as steel, having anchoring projections as hereinafter described, adapted to be embedded in the facing of the pad. Said facing includes a heel block or cushion 16, and a relatively thin fore part 17 united to the cushion and extending forward therefrom. The facing covers the fabric layer 13, and each of its parts is composed of a vulcanizable composition.

The composition of the cushion may be as follows, the proportions specified being by weight: crude rubber, five parts, reclaimed rubber, fifteen parts, mineral rubber or asphalt, five parts, litharge, two parts, rubber substitute, one part, ground cured rubber, two parts, ground cork, one part.

The cushion, molded into substantially the form shown by Fig. 7, is laid on the fabric layer 13 and reinforcing plate 15 and receives the anchoring projections thereon hereinafter described.

The composition of the fore part 17 of the facing may be similar to that usually employed for elastic rubber heels for leather boots and shoes, and said fore part, the rear edge of which is molded to fit the contour of the front edge of the heel portion 16, is laid, with the latter, on the fabric layer 13.

The anchoring projections on the reinforcing plate 15, as here shown, include hooked ears or flanges 19 and 20 formed as represented by Figs. 5 and 6, and arranged to be embedded in the cushion 16. Said anchoring projections may also include ears 21 and an arched bridge 22, both ends of which are joined to the body of the plate, while its intermediate portion is offset therefrom and constitutes a frog-cushioning spring, the ears 21 and bridge 22 being arranged to be embedded in the fore part 17 of the facing at points in close proximity to the cushion 16. The plastic material of the fore part 17 receives the said ears 21 and bridge 22, and fills the space between said bridge and the fabric layer 13, as shown by Fig. 3, so that the fore part is anchored to the reinforcing plate.

The facing fore part 17 has a thickened bulging portion 17ª forming a central cushion which is thinner than the heel cushion 16 and joins the forward edge of the latter. The central cushion contains the resilient bridge 22, and is so located relatively to the frog as to protect the latter from injury in case the central portion of the pad bears on a pebble or other projection on the road.

The back layer or upper surface of the pad is preferably provided with a recess or depression 24 located under the reinforcing plate 15 and arranged to prevent injurious pressure on the frog.

The described parts, assembled in an unvulcanized condition, are placed in a suitable vulcanizing mold, and subjected to vulcanizing heat, which permanently unites said parts while vulcanizing the rubber portions thereof. The mold preferably has provisions for forming on the facing fore part at the margin of the central cushion 17ª a U-shaped ridge 17ᵇ, which joins forwardly projecting wings or buttresses 16ª formed on the front edge of the heel cushion. Said ridge forms an enlargement of the central cushion 17ª and has sloping sides which are formed to deflect nails or other instrumentalities likely to penetrate said cushion and injure the frog.

The back layer 12 when vulcanized becomes sufficiently hard to not only resist wear but also to impart a desirable stiffness to the pad and firmly hold the fabric layer 13. As shown by Figs. 2 and 3, the back layer 12 is considerably thicker at the heel end of the pad than elsewhere. The thickness of this portion of the back layer, and its relative hardness and stiffness cause the said portion, which projects rearwardly from the reinforcing plate 15, to suitably stiffen the heel end of the pad.

The cork content of the heel cushion enables the cushion to cling to a slippery pavement, thus minimizing liability of slipping. The non-slipping quality of the heel cushion is increased by the mineral rubber ingredient.

The reinforcing plate stiffens the base of the heel cushion and prevents the heel portion of the pad from being abruptly indented. The anchoring projections on said plate prevent liability of the facing parts engaged therewith, and particularly the heel cushion, from being wrenched from the fabric layer 13.

The buttresses 16ª and the outer side of the ridge 17ᵇ are formed to bear on the inner edge of a horse-shoe seated on the facing fore part 17.

Having described our invention, we claim:

1. A horse shoe pad comprising a back layer of vulcanizable material which becomes relatively stiff when vulcanized, a layer of textile fabric associated with the back layer, and a cushioned facing of vulcanizable material covering the fabric layer, the material of the facing being relatively elastic when vulcanized.

2. A horse shoe pad comprising a back layer of vulcanizable material which becomes relatively stiff when vulcanized, a layer of textile fabric associated with the back layer, and a cushioned facing of vulcanizable material covering the fabric layer, the material of the facing being relatively elastic when vulcanized, said facing including a relatively thick heel cushion.

3. A horse shoe pad comprising a back layer of vulcanizable material which becomes relatively stiff when vulcanized, a layer of textile fabric associated with the back layer, and a cushioned facing of vulcanizable material covering the fabric layer, the material of the facing being relatively elastic when vulcanized, said facing including a relatively thick heel cushion and a central cushion of lesser thickness than the heel cushion.

4. A horse shoe pad comprising a back layer of vulcanizable material which becomes relatively stiff when vulcanized, a layer of textile fabric associated with the back layer, a reinforcing plate attached to the fabric layer and provided with anchoring means, and a cushioned facing of vulcanizable material covering the fabric layer and anchored thereto by said anchoring means, the material of said facing being relatively elastic when vulcanized.

5. A horse shoe pad comprising a back layer of vulcanizable material which becomes relatively stiff and hard when vulcanized, said layer being thickened at its heel end portion, a layer of textile fabric associated with the back layer, and a heel cushion of vulcanizable material backed by the fabric layer and by the thickened heel portion of the back layer.

6. A horse shoe pad comprising a back layer of vulcanizable material which becomes relatively stiff and hard when vulcanized, said layer being thickened at its heel end portion, a layer of textile fabric associated with the back layer, a heel cushion backed by the rear portion of the fabric layer, and a central cushion backed by the central portion of the fabric layer.

7. A horse shoe pad comprising a back layer of vulcanizable material, a fabric layer associated with the back layer, a reinforcing plate attached to the fabric layer and provided with anchoring projections, and a cushioned facing of vulcanizable material backed by said layers and reinforcing plate and interlocked with the said projections.

8. A horse shoe pad comprising a back layer of vulcanizable material, a fabric layer associated with the back layer, a reinforcing plate attached to the fabric layer and provided with anchoring projections, and a heel cushion of vulcanizable material backed by said layers and reinforcing plate and interlocked with the said projections.

9. A horse shoe pad comprising a back layer of vulcanizable material, a fabric layer associated with the back layer, a reinforcing plate attached to the fabric layer and provided with anchoring projections, a heel cushion of vulcanizable material backed by said layers and reinforcing plate and interlocked with the said projections, and a central cushion of vulcanizable material adjoining the forward edge of the heel cushion.

10. A horse shoe pad comprising a back layer of vulcanizable material, a fabric layer associated with the back layer, a reinforcing plate attached to the fabric layer and provided with anchoring projections, a heel cushion of vulcanizable material backed by said layers and reinforcing plate and interlocked with the said projections, and a central cushion of vulcanizable material adjoining the forward edge of the heel cushion, the reinforcing plate being provided with an arched bridge embedded in said central cushion.

11. A horse shoe pad comprising a back layer of vulcanizable material which becomes relatively stiff and hard when vulcanized, said layer being thickened at its heel end portion, a layer of textile fabric associated with the back layer, a heel cushion backed by the rear portion of the fabric layer, and a central cushion backed by the central portion of the fabric layer, said central cushion being provided with a marginal ridge.

12. A horse shoe pad comprising a back layer of vulcanizable material, a fabric layer associated therewith, and a heel cushion backed by said layers and composed of a vulcanizable composition including cork and mineral rubber.

In testimony whereof we have affixed our signatures.

ANDREW McTERNEN.
JOHN A. HALE.

Copies of this patent may be obtained for five cents each, by addressing the "Commissioner of Patents, Washington, D. C."